United States Patent
Zhu et al.

(10) Patent No.: US 8,994,352 B2
(45) Date of Patent: Mar. 31, 2015

(54) SWITCHING REGULATOR AND CONTROL METHOD FOR SAME

(75) Inventors: Jack Zhu, Shanghai (CN); Basa Wang, Shanghai (CN); Kevin Yao, Shanghai (CN); Helen Yu, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 450 days.

(21) Appl. No.: 13/364,711

(22) Filed: Feb. 2, 2012

(65) Prior Publication Data

US 2013/0043850 A1 Feb. 21, 2013

(30) Foreign Application Priority Data

Aug. 15, 2011 (CN) .......................... 2011 1 0232548

(51) Int. Cl.
*H02M 3/156* (2006.01)
*H02M 1/00* (2006.01)

(52) U.S. Cl.
CPC ...... *H02M 3/156* (2013.01); *H02M 2001/0032* (2013.01); *Y02B 70/16* (2013.01)
USPC .......................................... 323/284; 323/285

(58) Field of Classification Search
CPC ...... H02M 3/145; H02M 3/155; H02M 3/156
USPC .................. 323/282, 283, 284, 351
See application file for complete search history.

(56) References Cited

U.S. PATENT DOCUMENTS

| | | | |
|---|---|---|---|
| 6,366,064 B1 * | 4/2002 | Reichard | 323/224 |
| 8,120,341 B2 | 2/2012 | Melanson | 323/282 |
| 2007/0252567 A1 | 11/2007 | Dearn et al. | |

FOREIGN PATENT DOCUMENTS

| | | |
|---|---|---|
| CN | 1251390 C | 4/2006 |
| CN | 101064472 A | 10/2007 |
| CN | 101292415 A | 10/2008 |
| CN | 101795070 A | 8/2010 |
| WO | WO-99/08372 A1 | 2/1999 |
| WO | WO-2007/041898 A1 | 4/2007 |

OTHER PUBLICATIONS

"Chinese Application Serial No. 201110232548.5, Office Action mailed Jul. 2, 2014", (w/ English Summary), 13 pgs.
Shurong, G. U., "Research and Design on 2/3/4 Phase Buck Controller", Dissertation, submitted in conformity with the requirement of Master's Degree in Zhejiang University, Hangzhou, China, (w/ English Abstract), (May 10, 2007), 81 pgs.

* cited by examiner

*Primary Examiner* — Gary L Laxton
(74) *Attorney, Agent, or Firm* — Schwegman Lundberg & Woessner, P.A.

(57) ABSTRACT

A switching regulator and control method for the same. The switching regulator employs a hybrid mode. A ramp voltage signal is added to the current sense signal to make the ramp voltage signal overtake the current information when the duty cycle becomes low.

20 Claims, 13 Drawing Sheets

SWITCHING REGULATOR AND CONTROL METHOD FOR SAME

CROSS-REFERENCE TO RELATED APPLICATIONS

This application claims priority to Chinese Patent Application No. 201110232548.5, filed on Aug. 15, 2011 and entitled "Switching regulator and control method for the same", which is incorporated herein in its entirety by reference.

TECHNICAL FIELD

The present disclosure relates to a switching power supply, and more particularly, to a switching regulator and control method for same.

DESCRIPTION OF THE RELATED ART

Typically, in the event that an input voltage, an internal parameter, or an outside connected load for a switching power supply varies, a switching regulator employs a closed-loop feedback to determine the difference between a controlled signal and a reference signal, so as to control the regulator's switching device and thereby regulate an output voltage or current and the like of the switching power supply.

Signals that may be sampled to control the switching power supply include the output voltage, an input voltage, the output current, an output sensing voltage, the peak current of the switching device, and the like. A single-loop, double-loop, or multiple-loop feedback system can be formed with those signals to regulate the voltage, the current or to provide a constant power, while additional functions like over-current protection, anti-biasing and the like can be implemented.

A switching power supply is often operated in "peak current mode" (also referred as a current mode). With a peak current control scheme, two loops, i.e., an outer voltage loop and an inner current loop, will be used to generate a low output voltage from a high input voltage.

Current mode control needs to blank current sense ringing, as shown in FIG. 1a. Specifically, when detecting the sense current, a blanking time is needed until the sense current is detected. This will limit the on time of the regulator's main switch. The current sensing signal on the main switch is formed by the blanking time and the on time. The blanking time indicates the minimum on time that can be obtained by the main switch using peak current mode control with, for example, a step-down converter.

Further, when operating at low duty cycle, such as when the output is substantially smaller than the input, it is hard to generate the low duty cycle from the higher input voltage, since there is almost no time for current sensing due to the constraint of current settling time. Therefore this limits the conversion of small output voltage.

In addition, as shown in FIG. 1b, as a result for the effect of the minimum on time, the conventional current mode can cause high overshoot at load transient and induce serious overshoot transient change.

On the other hand, for light load conditions, a small current sense signal at a low duty cycle will be sensitive to noise and exhibit poor noise immunity performance. Since the inductor is at a state of consecutive energy storage, the up slope of the current signal for the switching device generally is small, and small noise on the current signal tends to change the on-off timing of the switching device and cause the system to exhibit subharmonic oscillation.

In order to shorten the minimum on time, other control modes, such as voltage mode, valley current mode, and emulated current mode (ECM), may be tried. However, these modes are more complex in implementation and difficult to apply. Further, under heavy load, these modes have lower dynamic performance as compared with peak current mode, and also have poor noise immunity performance for low duty cycle conditions.

SUMMARY OF THE INVENTION

In view of the above problems, this invention is made to overcome some or all of the problems existing in the prior art.

The present disclosure recognizes that all the problems mentioned above for conventional peak current mode occur at low duty cycle and light load conditions, mainly because of the blanking time and the small current sensing signal introduced by current mode control.

A main concept of the invention is to make a switching regulator with peak current mode control operate like voltage mode control instead of current mode control at low duty cycles. In other words, a switching regulator according to an embodiment of this invention adopts a hybrid mode control, so as to take advantage of both voltage mode control and current mode control. As is well-known, voltage mode control has no minimum on time limitation and current mode control has fast response performance.

Generally, the invention is implemented by adding a ramp voltage signal to the current sense signal at low duty cycle and making the ramp voltage signal overtake the current information when the duty cycle becomes low, wherein the slope of the ramp voltage signal is increased when the duty cycle is below a predetermined threshold.

According to one aspect of this disclosure, there is provided a switching regulator. The switching regulator includes a mode transforming device configured to transform the control mode for the switching regulator according to duty cycle, such that the switching regulator operates in a hybrid control mode comprising a current mode and a voltage mode.

Preferably, in the switching regulator, the mode transforming device is configured to cause the switching regulator to transform from operating in current mode to operating in voltage mode as the duty cycle decreases.

Preferably, in the switching regulator, the mode transforming device is configured to cause the switching regulator to operate in voltage mode when the duty cycle is not greater than a predetermined threshold.

Preferably, in the switching regulator, the predetermined threshold is determined according to the switching cycle and the minimum on time during current mode operation of the switching regulator.

Preferably, in the switching regulator, the mode transforming device further comprises: a current sensing device configured to generate a current sensing signal; a slope compensation device configured to generate a ramp voltage signal as a function of the duty cycle; and a summing device coupled to sum the ramp voltage signal and the current sensing signal. Also, the switching regulator further comprises: an error amplifier coupled to receive a reference voltage signal and to output a comparison voltage to be compared with a sampling control signal; and a comparing device coupled to compare the summed signal from the summing device as the sampling control signal with the comparison voltage; the switching regulator configured to adjust its output in response to the result of the comparison from the comparing device.

Preferably, in the switching regulator, the current sensing device is configured to set a settling time for the current sensing signal such that the settling time slows as compared with that at the current mode control.

Preferably, in the switching regulator, the slope compensation device further comprises: a base compensation current generating device configured to generate a base compensation current signal for slope compensation while in current mode; a first injection current generating device configured to generate a first injection current signal having a value substantially inversely proportional to the duty cycle; a current combination device configured to combine the base compensation current signal and the first injection current signal; and a current-voltage conversion device coupled to generate the slope compensation voltage signal by using the combined signal from the current combination device.

Preferably, in the switching regulator, the slope compensation device further comprises: a base compensation current generating device configured to generate a base compensation current signal for slope compensation while in current mode; a first injection current generating device configured to generate a first injection current signal having a value substantially inversely proportional to the duty cycle; a second injection current generating device configured to generate a second injection current signal as an exponential current through charging and discharging operations by using the first injection current signal; a current combination device configured to combine the base compensation current signal and the second injection current signal; and a current-voltage conversion device coupled to generate the slope compensation voltage signal by using the combined signal from the current combination device.

Preferably, in the switching regulator, the base compensation current generating device further comprises: a base current-voltage conversion unit coupled to generate a base voltage by performing the charging operation when the switching regulator is turned off; a base switch capacitor integration unit coupled to generate the integrated base voltage by performing an integration operation on the base voltage when the switching regulator is turned on; and a base voltage-current conversion unit coupled to convert the integrated base voltage into the base compensation current.

Preferably, in the switching regulator, the first injection current generating device further comprises: a first current-voltage conversion unit coupled to generate a first injection voltage by performing the charging operation when the switching regulator is turned on; a first switch capacitor integration unit coupled to generate the integrated first injection voltage by performing an integration operation on the first injection voltage when the switching regulator is turned off; and a first voltage-current conversion unit coupled to convert the integrated first injection voltage into the first injection current.

Preferably, in the switching regulator, the second injection current generating device further comprises: a second current-voltage conversion unit coupled to generate a second injection voltage by performing the charging operation when the switching regulator is turned off; and a second voltage-current conversion unit coupled to convert the second injection voltage into the second injection current by performing the discharge operation when the switching regulator is turned on.

Preferably, in the switching regulator, the current sensing device is further configured to perform the processes of: detecting the current sensing signals of high side and low side; setting the settling time of the high side current sensing signal to be not greater than the blanking time of the low side current sensing signal; when the duty cycle is higher than the predetermined threshold, employing the high side current sense signal, and if an over-current occurs and counts until the set settling time of the high side current sensing signal, then entering a hiccup mode; and when the duty cycle is not higher than the predetermined threshold, employing the low side current sense signal, and if the over-current with a glitch time occurs, then entering the hiccup mode.

According to another aspect of this disclosure, there is provided a switching power supply configured to generate a steady output voltage from an input voltage. The switching power supply can comprise the switching regulator described above.

According to still another aspect of this disclosure, there is provided a method of controlling a switching regulator. The method comprises: providing a hybrid control mode comprising a current mode and a voltage mode; and transforming the control mode of the switching regulator according to the duty cycle of the switching regulator, wherein the switching regulator is caused to operate in current mode when the duty cycle is greater than a predetermined threshold; and wherein the switching regulator is caused to operate in voltage mode when the duty cycle is not greater than the predetermined threshold.

Preferably, in the method, the predetermined threshold is determined according to the switching cycle and the minimum on time during current mode operation of the switching regulator.

Preferably, in the method, the transforming further comprises: generating a current sensing signal; generating a ramp voltage signal as a function of the duty cycle; summing the ramp voltage signal and the current sensing signal; and controlling the transformation of the control mode of the switching regulator through the summed signal.

Preferably, in the method, generating the current sensing signal further comprises setting a settling time of the current sensing signal such that the settling time slows as compared with that at the current mode control.

Preferably, in the method, generating the ramp voltage signal further comprises: generating a base compensation current signal for slope compensation while in current mode; generating a first injection current signal having a value substantially inversely proportional to the duty cycle; combining the base compensation current signal and the first injection current signal; and generating the slope compensation voltage signal by using the combined signal.

Preferably, in the method, generating the ramp voltage signal further comprises: generating a base compensation current signal for slope compensation while in current mode; generating a first injection current signal having a value substantially inversely proportional to the duty cycle; generating a second injection current signal as an exponential current through charging and discharging operations by using the first injection current signal; combining the base compensation current signal and the second injection current signal; and generating the slope compensation voltage signal by using the combined signal from the current combination device.

Preferably, in the method, generating the current sensing signal further comprises: detecting the current sensing signals of high side and low side; setting the settling time of the high side current sensing signal to be not greater than the blanking time of the low side current sensing signal; when the duty cycle is higher than the predetermined threshold, employing the high side current sense signal, and if the over-current occurs and counts until the set settling time of the high side current sensing signal, then entering a hiccup mode; and when the duty cycle is not higher than the predetermined threshold, employing the low side current sense signal, and if the over-current with a glitch time occurs, then entering the hiccup mode.

As compared with the prior arts, the embodiment of the hybrid mode control based on peak current mode according to this disclosure is easy to implement. The embodiment of the hybrid mode control based on peak current mode according to this disclosure has better dynamic performance at heavy load.

Further, the embodiment of the hybrid mode control based on peak current mode according to this disclosure can improve jittering for small duty cycle conditions, and therefore the noise immunity performance.

BRIEF DESCRIPTION OF THE DRAWINGS

The following detailed description of some example embodiments will be better understood when read in conjunction with the appended drawings. It should be understood, however, that example embodiments are not limited to the precise arrangements and instrumentalities shown. In the drawings, like numerals are used to indicate like elements throughout. Furthermore, other desirable features and characteristics will become apparent from the subsequent detailed description and the appended claims, taken in conjunction with the accompanying drawings and the foregoing technical field and background.

For simplicity and clarity of illustration, the drawing figures illustrate the general manner of construction, and descriptions and details of well-known features and techniques may be omitted to avoid unnecessarily obscuring aspects of the illustrated embodiments. Additionally, elements in the figures are not necessarily drawn to scale. For example, the dimensions of some of the elements or regions in some of the figures may be exaggerated relative to other elements or regions of the same or other figures to help improve understanding of the example embodiments. In the drawings.

DETAILED DESCRIPTION OF THE PREFERRED EMBODIMENT

Prior to describing the particular embodiments of this disclosure, the general concept or principle of this invention is explained as follows.

Typically, for a switching regulator operating in peak current mode, especially when the duty cycle is larger than 50%, jitter may cause subharmonic oscillation, which in turn may reduce the average output current and increase the ripple of the output current. To overcome this problem, slope compensation is needed. Conventionally, an outer slope is added to the current sensing signal. A current signal for generating the outer slope applied with respect to the oscillation of the current mode may also be referred as a base compensation current signal.

The embodiments according to this disclosure can implement the hybrid mode control by adding an improved ramp voltage signal to the current sensing signal.

Figure 1A:
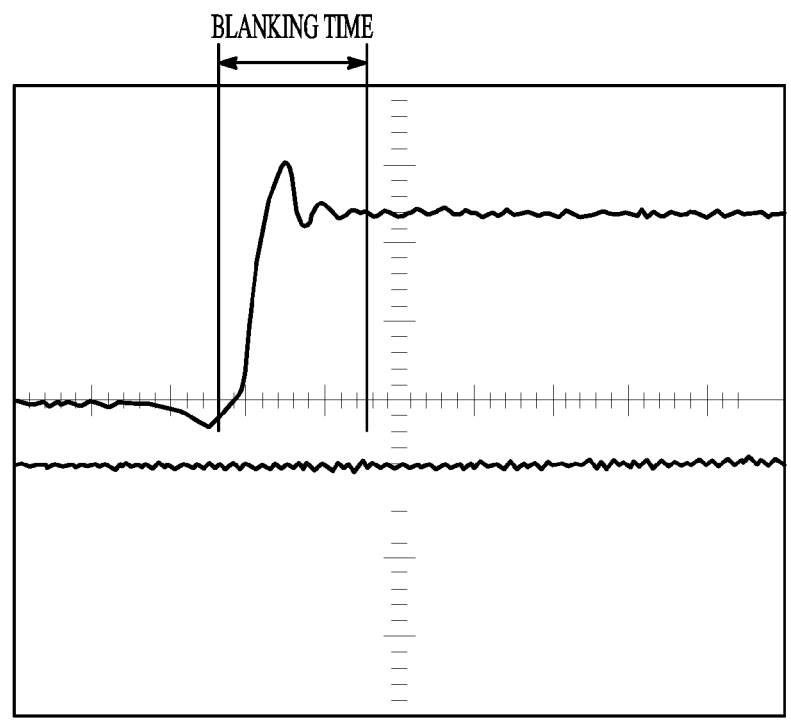
FIGS. 1a and 1b are schematic diagrams illustrating known current mode control techniques.
Figure 1B:
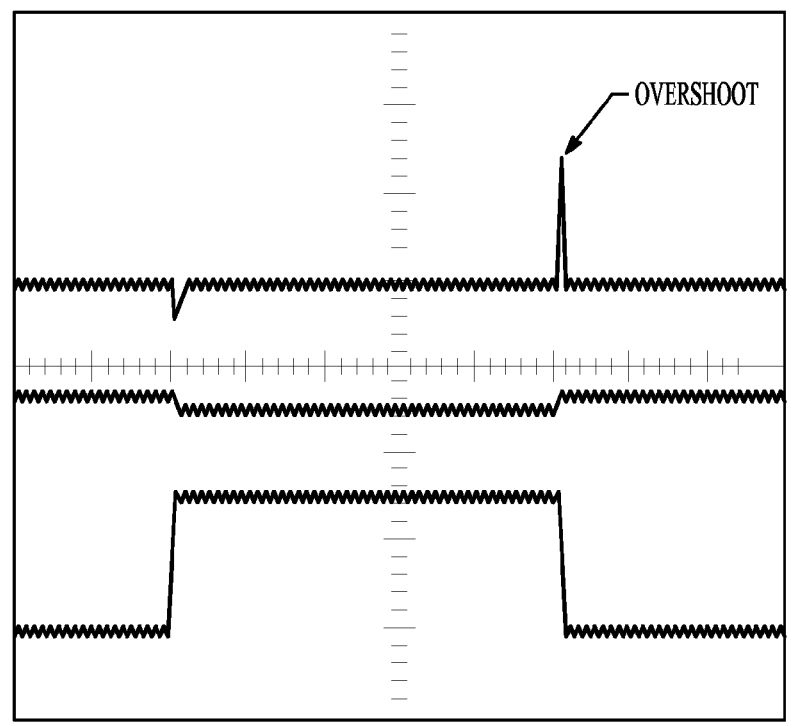
Figure 2:
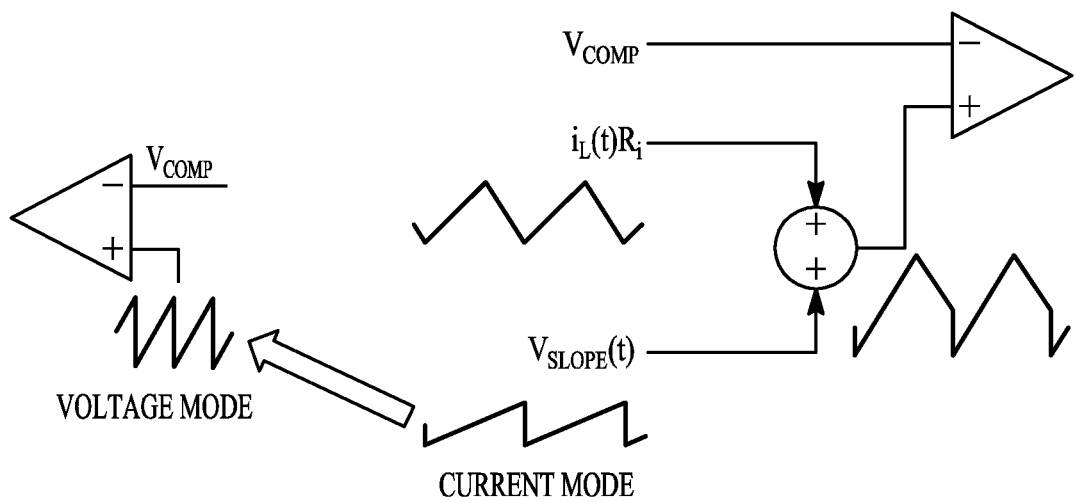
FIG. 2 is a schematic diagram illustrating the general concept of this invention.

By reference to FIG. 2, according to the embodiments of this disclosure, the ramp voltage signal $V_{slope}$ is summed with the current sensing signal $i_L(t)Ri$, and then the sum is compared with a comparison voltage $V_{COMP}$. The slope of the ramp voltage signal $V_{slope}$ is increased at low duty cycle, so as to cause the ramp voltage signal to overtake the current information when the duty cycle becomes low. When this happens, the current sampling signal substantially has no effect on the control of the switching regulator. That is, the current mode is transformed to the voltage mode.

To realize a smooth transition between current mode and voltage mode, the slope of the ramp signal vs. duty cycle can be made like a parabola: big at small and large duty cycles, and small at a medium duty cycle.

On the other hand, the settling time of the current sensing signal can be set such that current sense settling time becomes slow with respect to the conventional signal mode, so as to reduce or even eliminate the blanking time for current sensing. Thereby, the current information sampled within a unit time becomes less, and becomes less as the duty cycle becomes smaller. As a result, effective current information substantially cannot be sampled at low duty cycles. Thereby, the switching regulator is caused to transform from the current mode to the voltage mode.

The embodiments of this invention may involve the switching regulator, switching power supply and the like. The invention is preferably applied to a high-input, low-output step-down switching regulator, switching stabilizer or power converter.

The detailed description set forth below in connection with the appended drawings is intended as a description of some of the example embodiments, and is not intended to completely describe all possible embodiments. That is, there is no intention to be bound by any expressed or implied theory presented in the preceding technical field, background, or the following detailed description of example embodiments. It is to be understood that the same or equivalent functions may be accomplished by different embodiments.

The terms "first", "second", "third", "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of use in sequences other than those illustrated or otherwise described herein. Furthermore, the terms "comprise," "include," "have" and any variations thereof, are intended to cover non-exclusive inclusions, such that a process, method, article, or apparatus that comprises, includes, or has a list of elements is not necessarily limited to those elements, but may include other elements not expressly listed or inherent to such process, method, article, or apparatus.

Figure 3:
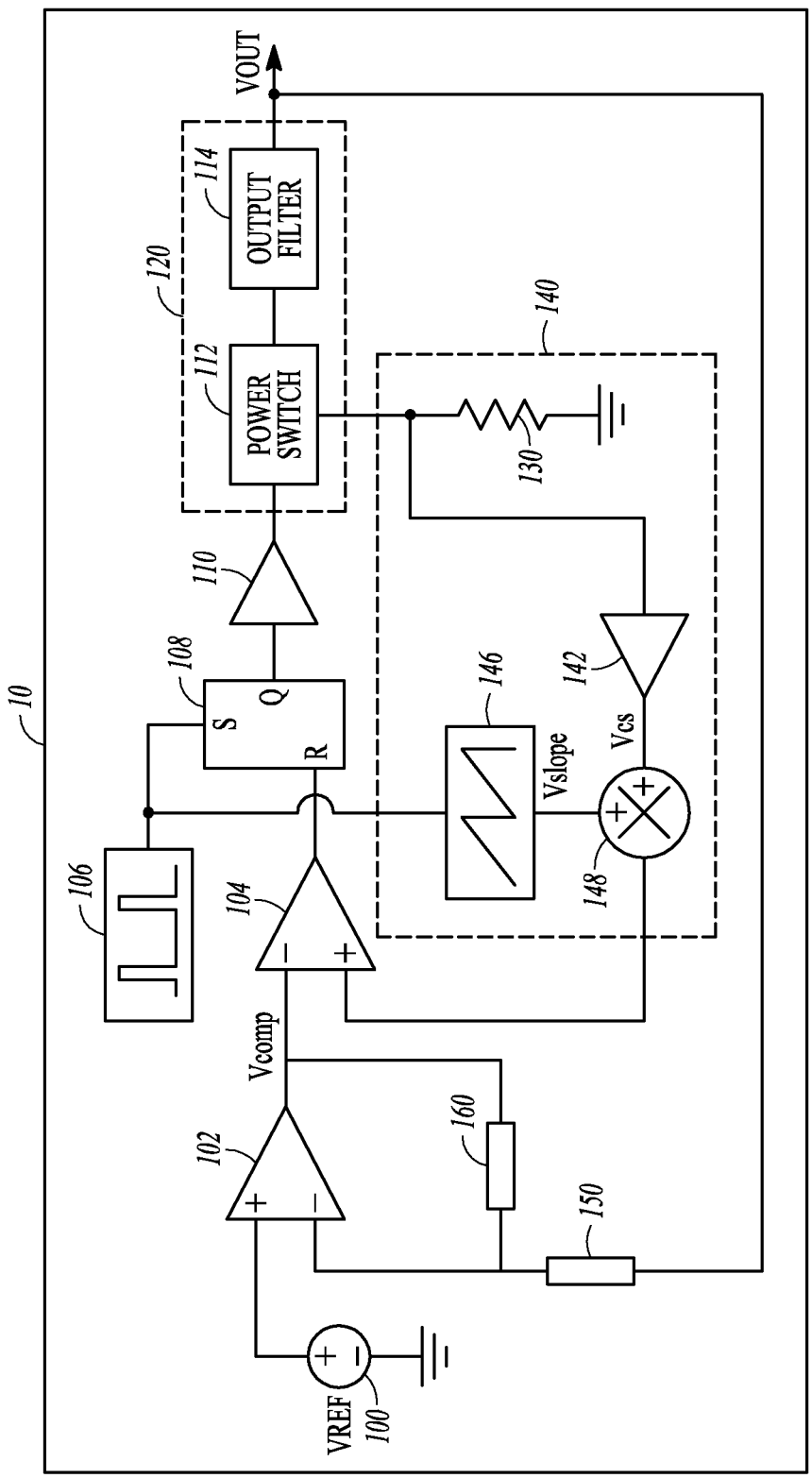
FIG. 3 is a schematic diagram illustrating a switching regulator according to an embodiment of this invention.

FIG. 3 is a schematic diagram illustrating a switching regulator according to an embodiment of this invention.

As shown in FIG. 3, a switching regulator 10 may comprise a reference voltage source 100, an error amplifier 102, a comparator 104, an oscillator 106, a flip-flop 108, a driver 110 and a power stage 120. A reference voltage VREF is coupled to the positive input of the error amplifier 102. The output of the switching regulator 10, VOUT, may be fed back to the negative input of the error amplifier 102 via a resistor 150. The output of the error amplifier 102, Vcomp, may be coupled to the negative input thereof via a resistor 160. The comparator 104 can compare the output Vcomp with a sampling control signal. In this embodiment, the sampling control signal may be a combination of a current sensing signal Vcs and a slope compensation voltage $V_{slope}$. The switching regulator 10 regulates the output VOUT based on the result of the comparison. The power stage 120 may comprise a power switch 112 and an output filter 114. A steady VOUT is provided after being subjected to a filtering process via output filter 114.

As shown, the switching regulator 10 according to the embodiment of this invention further comprises a mode transforming device 140. It is noted that, except for mode transforming device 140, the other elements and the operations of a switching regulator can apply any conventional design in the art without being limited to the illustrated examples, as appreciated by one skilled one in the art. For the sake of brevity, detailed descriptions of some elements may be omitted.

The mode transforming device 140 is configured to transform the control mode of the switching regulator 10 according to the duty cycle, such that the switching regulator 10 can operate in a hybrid control mode comprising the current mode and the voltage mode. In this embodiment, the mode transforming device 140 is configured to cause the switching regulator 10 to transform from operating in current mode to operating in voltage mode as the duty cycle decreases. Further, if the duty cycle is not greater than a predetermined threshold, the mode transforming device 140 causes the switching regulator 10 to operate in voltage mode. In the context of this application, the duty cycle may correspond to a ratio of the output voltage to the input voltage. The predetermined threshold may be determined as desired. For example, the switching regulator 10 may be designed to operate in voltage mode when the duty cycle is not greater than 20%, and to operate in current mode when the duty cycle is greater than 20%. To take advantage of the benefits of both the current mode and the voltage mode as much as possible, the predetermined threshold may be determined according to the switching cycle and minimum on time in current mode. For instance, the predetermined threshold may be determined as approximately a ratio of the minimum on time to the switching cycle.

As an example, the mode transforming device 140 may comprise a slope compensation device 146. The slope compensation device 146 is configured to generate a ramp voltage signal $V_{slope}$ as a function of the duty cycle.

The mode transforming device 140 may comprise a current sensing element such as a sensing resistor 130. The sensing resistor 130 is configured to generate a current sensing signal, and to generate sensing voltage Vcs through a current amplifier 142. In the context of this application, the sensing resistor 130 and the current amplifier 142 may be collectively referred as a current sensing device.

The mode transforming device 140 may further comprise a summing device 148, such as an adder circuit. The summing device is coupled to sum the ramp voltage signal $V_{slope}$ generated by the slope compensation device 146 and the Vcs generated by the current sensing device, so as to generate a compensation signal to be compared with the comparison voltage Vcomp.

Figure 4:
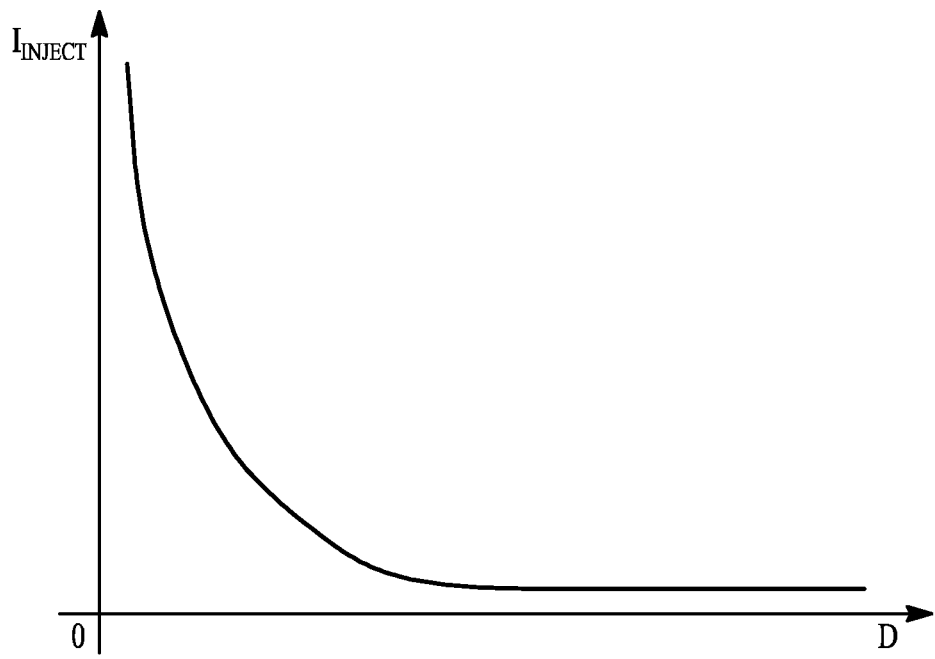
FIG. 4 is a graph illustrating the relationship between the duty cycle and an injection current generated in the switching regulator according to an embodiment of this invention.

FIG. 4 is a graph illustrating the relationship between the duty cycle and an injection current generated in the switching regulator 10 according to an embodiment of the invention. As shown in FIG. 4, according to this embodiment, the slope compensation device 146 is configured to generate a current $I_{inject}$ having a value substantially inversely proportional to the duty cycle D.

Figure 5:
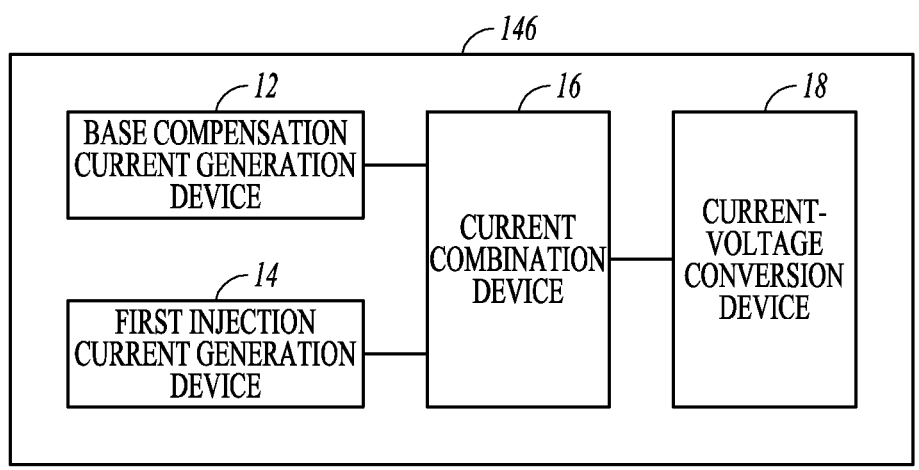
FIG. 5 is a schematic block diagram illustrating a slope compensation device in a switching regulator according to an embodiment of this invention.

FIG. 5 is a block diagram illustrating the slope compensation device 146 in the switching regulator 10 according to the embodiment of this invention. As shown in FIG. 5, the slope compensation device 146 may comprise a base compensation current generating device 12, a first injection current generating device 14, a current combination device 16, and a current-voltage conversion device 20.

The base compensation current generating device 12 is configured to generate a base compensation current signal for the slope compensation of the current mode of the switching regulator 10. The first injection current generating device 14 is configured to generate a first injection current signal having a value substantially inversely proportional to the duty cycle.

The current combination device 16 is coupled to the base compensation current generating device 12 and the first injection current generating device 14, and is configured to combine the base compensation current signal from the base compensation current generating device 12 and the first injection current signal from the first injection current generating device 14.

The current-voltage conversion device 20 is coupled to the current combination device 16, and is configured to generate the slope compensation voltage signal $V_{slope}$ by using the combined signal from the current combination device 16.

Figure 6:
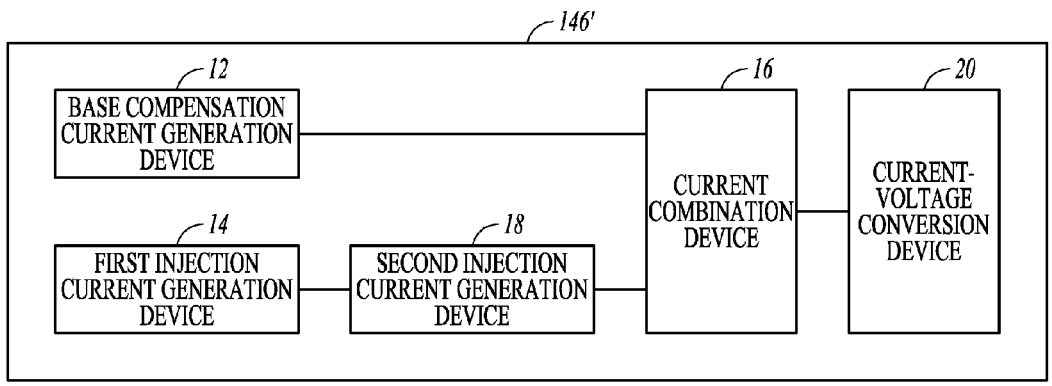
FIG. 6 is a schematic block diagram illustrating a slope compensation device in a switching regulator according to another embodiment of this invention.

FIG. 6 is a block diagram illustrating a slope compensation device 146' in the switching regulator 10 according to another embodiment of this invention. As shown in FIG. 6, the slope compensation device 146' differs from slope compensation device 146 in that it further comprises a second injection current generating device 18.

The second injection current generating device 18 is coupled to the first injection current generating device 14, and is configured to generate a second injection current signal through charging and discharging operations by using the first injection current signal from the first injection current generating device 14. The second injection current signal is an exponential current whose value significantly decreases as the duty cycle increases (which will be described in more detail hereafter). Therefore, when the duty cycle increases, the injection current will not overcompensate the current sensing signal, and thus will not adversely effect the performance of the current mode operation of switching regulator 10.

The current combination device 16 is coupled to the base compensation current generating device 12 and the second injection current generating device 18, and is configured to combine the base compensation current signal from the base compensation current generating device 12 and the second injection current signal from the second injection current generating device 18. The current-voltage conversion device 20 is coupled to the current combination device 16, and is configured to generate the slope compensation voltage signal $V_{slope}$ by using the combined signal from the current combination device 16.

Figure 7:
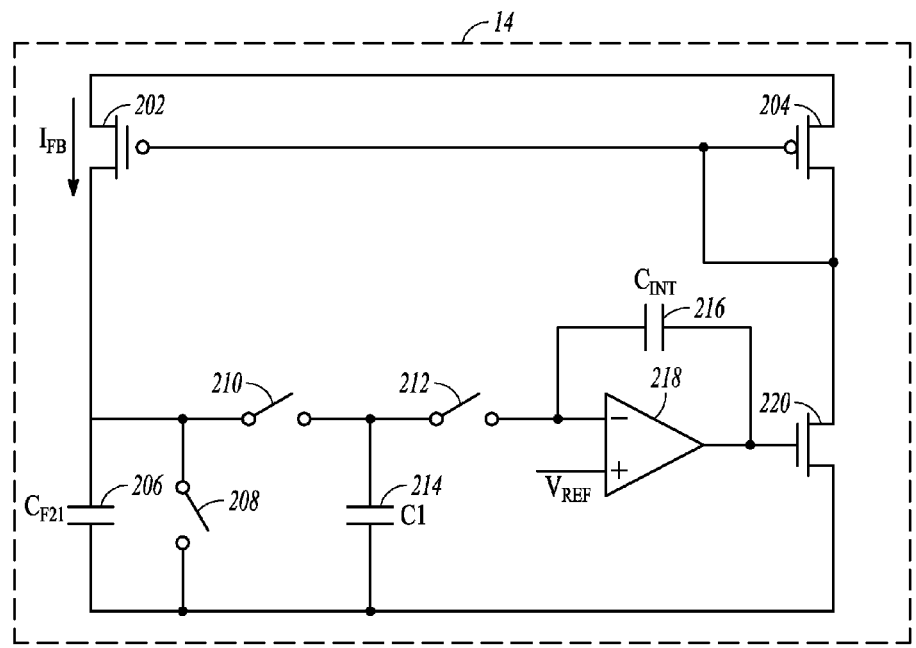
FIG. 7 is a schematic diagram illustrating a first injection current generating device in a switching regulator according to an embodiment of this invention.

FIG. 7 is a schematic diagram illustrating the first injection current generating device 14 in the switching regulator 10 according to an embodiment of the invention. It is noted that the specific structure and description of the first injection current generating device 14 herein are merely illustrative. One skilled in the art can appreciate that the first injection current generating device 14 can employ other structures, provided that it can generate an injection current substantially inversely proportional to the duty cycle as required by this disclosure.

As shown, the first injection current generating device 14 comprises a transistor 202, a transistor 204, a capacitor 206, a switch 208, a switch 210, a switch 212, a capacitor 214, a capacitor 216, an operational amplifier 218, and a transistor 220.

The transistor 202 and transistor 204 are coupled in a current minor configuration. For example, when transistors 202 and 204 are PMOS transistors, their gates are coupled to each other. One of the source and drain of transistor 202 is coupled to one of the source and drain of transistor 204. The gate of transistor 204 is further coupled to the other of the source and drain thereof. As known by those skilled in the art, the source and the drain for a transistor are generally interchangeable, and can be determined according to the actual operation. Thereby, the terms "one of the source and drain" and "the other of the source and drain" are used in this application.

The other of the source and the drain of transistor 202 is coupled to a capacitor 206 and to switches 208, 210. The capacitor 206 is coupled in parallel with the switch 208 and a capacitor 214. The switch 210 is coupled in series with the switch 212.

When the switching regulator 10 is turned on, the switch 210 is closed, the switches 208 and 212 are opened, and the capacitors are charged. In this embodiment, the capacitor 206, the capacitor 214, and the switch 210 may also be collectively referred to as a first current-voltage conversion unit, which is coupled to generate a first injection voltage by performing the charging operation when the switching regulator 10 is turned on.

The positive input of an operational amplifier 218 is coupled to receive a reference voltage $V_{REF}$. The negative input of amplifier 218 is coupled to the switch 212. The capacitor 216 is coupled between an output and the negative input of amplifier 218, and functions as an integration capacitor $C_{INT}$. When the switching regulator 10 is turned off, the switch 210 is opened, and the switches 208 and 212 are closed, such that an integration operation is performed on the first injection voltage. In this embodiment, amplifier 218, the capacitor 216, and the switches 208 and 212 may also be collectively referred to as a first switch capacitor integration unit, which is coupled to generate the integrated first injection voltage by performing the integration operation on the first injection voltage when the switching regulator 10 is turned off.

A transistor 220 is coupled to the output of amplifier 218. The transistor 220 may be a transconductance transistor. For example, when the transistor is a NMOS transistor, its gate is coupled to the output of amplifier 218, one of the source and drain is coupled to the other of the source and drain of transistor 204, and to the gate of the transistor 204. The other of the source and drain of the transistor 220 is coupled to the capacitor 214. The integrated first injection voltage from the first switch capacitor integration unit is converted into a first injection current $I_{FB}$ though the transistor 220. In this embodiment, the transistor 220, the transistor 202, and the transistor 204 may also be collectively referred as a first voltage-current conversion unit, which is coupled to convert the integrated first injection voltage into the first injection current $I_{FB}$.

The first injection current generating device 14 according to this embodiment generates a first injection current $I_{FB}$ which is inversely proportional to the duty cycle. The first injection current $I_{FB}$ can be represented by the following equation $$I_{FB} = V_{REF} \times C_{F2I} \times \frac{f_s}{D}, \qquad (1)$$

where $V_{REF}$ is the reference voltage, $C_{F2I}$ is the capacitance of the capacitor 206, $f_s$ is the switching frequency, and D is the duty cycle.

Figure 8:
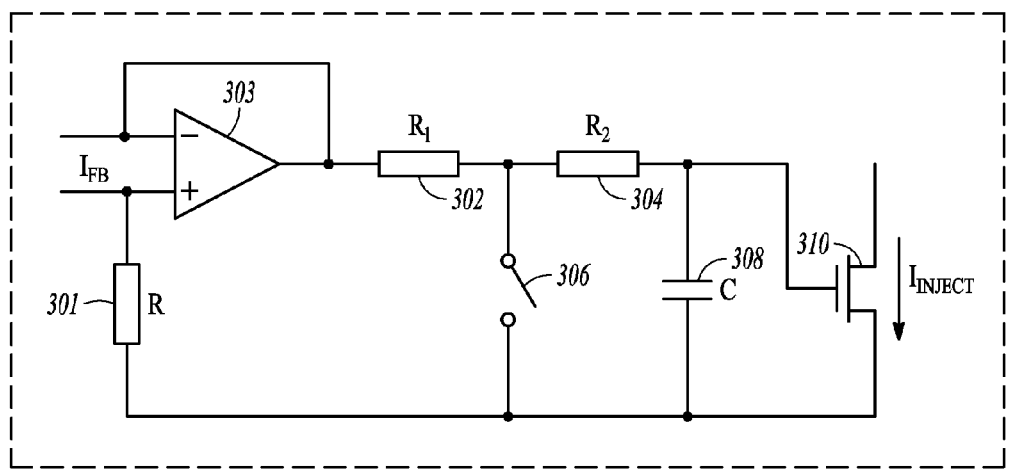
FIG. 8 is a schematic diagram illustrating a second injection current generating device in a switching regulator according to an embodiment of this invention.

FIG. 8 is a schematic diagram illustrating the second injection current generating device 18 in the switching regulator 10 according to an embodiment of the invention. The specific structure and description for the second injection current generating device 18 herein are merely illustrative. One skilled in the art can appreciate that the second injection current generating device 18 can employ any other structure, provided that it can generate the injection current that is an exponential current as required by this disclosure.

As shown, the second injection current generating device 18 comprises a voltage follower 303, a resistor 301, a resistor 302, a resistor 304, a switch 306, a capacitor 308, and a transistor 310.

The positive input of the voltage follower 303 is coupled to receive the first injection current $I_{FB}$ from the first injection current generating device 14. As an example, the voltage follower 303 can be coupled to receive the first injection current $I_{FB}$ from one of the source and drain of transistor 220 in the first injection current generating device 14. The resistor 301 is coupled to the positive input of the voltage follower 303. An output of the voltage follower 303 is coupled to a negative input thereof. The resistor 302 is coupled to the output of the voltage follower 303, and in series with the resistor 304. The resistor 304 is coupled in series with one terminal of the capacitor 308. The switch 306 is coupled between a node between the resistor 302 and the resistor 304 and the other terminal of the capacitor 308.

The transistor 310 may be a transconductance transistor having a gate coupled to one terminal of the capacitor 308. One of the source and drain of the transistor 310 is coupled to the other terminal of the capacitor 308. The other of the source and drain of the transistor 310 is coupled to output a second injection current $I_{inject}$. The other of the source and drain of the transistor 310 may be coupled to one of the source and drain of the transistor 204 of the first injection current generating device 14.

When the switching regulator 10 is turned off, the switch 306 is opened, and the capacitor 308 is charged by the first injection current $I_{FB}$ from the first injection current generating device 14. In this embodiment, the voltage follower 303, the resistor 301, the resistor 302, the resistor 304, the capacitor 308, and the switch 306 may also be collectively referred as a second current-voltage conversion unit, which is coupled to generate a second injection voltage by performing the charging operation when the switching regulator 10 is turned off.

When the switching regulator 10 is turned on, the switch 306 is closed, and a discharge operation is performed by using the generated second injection voltage. As a result, the second injection voltage is converted into a second injection current $I_{inject}$, and is output from the transistor 310. In this embodiment, the transistor 310 may also be referred to as a second voltage-current conversion unit, which is coupled to convert the second injection voltage into the second injection current $I_{inject}$ by performing a discharge operation when the switching regulator 10 is turned on.

The second injection current generating device 18 according to this embodiment generates the second injection current $I_{inject}$ as an exponential current. The second injection current $I_{inject}$ can be represented with the following equation:

$$I_{inject}(t) = V_{REF} \times C_{F2I} \times \frac{f_S}{D} \times e^{-\frac{t}{\tau}}, \tag{2}$$

where $R_1$ and $R_2$ are the resistances of the resistors 302 and 304, $\tau = R_2 C_2$, and $C_2$ is the capacitance of the capacitor 308.

The following equation can be derived from equation (2):

$$I_{inject}(t) = K \times \frac{f_S}{D} \times e^{-\frac{t}{\tau}}, \tag{3}$$

where $$K = V_{REF} \times C_{F2I}.$$

Figure 9:
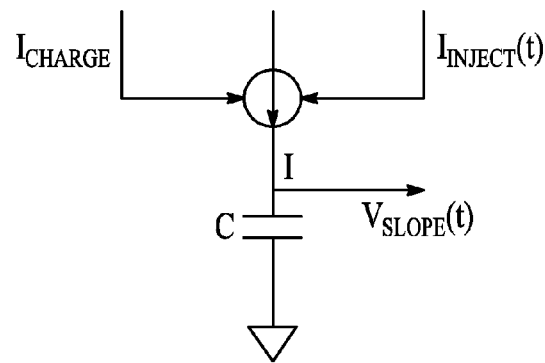
FIG. 9 is a schematic diagram illustrating a process for generating a total slope compensation voltage signal according to the embodiment of this invention.

FIG. 9 is a schematic diagram illustrating a process for generating a total slope compensation voltage signal $V_{slope}$. The second injection current $I_{inject}$ output from the second injection current generating device 18 can be combined with a base compensation current signal $I_{charge}$ generated by the base compensation current generating device 12 for the slope compensation of the current mode of the switching regulator 10. The current combination device 16, such as an adder, combines the base compensation current signal $I_{charge}$ from the base compensation current generating device 12 and the first injection current signal $I_{inject}$ from the first injection current generating device 14 to generate a total charging current I represented by the following equation:

$$I = I_{charge} + I_{inject}(t). \tag{4}$$

The current-voltage conversion device 20 generates the total slope compensation voltage signal $V_{slope}$ by using the combined total charging current I. For example, according to an embodiment of the invention, the capacitor C can be charged with the total current I to generate the total slope compensation voltage signal $V_{slope}(t)$ represented by the following equation:

$$V_{Slope}(t) = \int_0^t \frac{I}{C} dt = \frac{I_{charge} t}{C} + \frac{\tau K f_s}{DC}\left(1 - e^{-\frac{t}{\tau}}\right) \tag{5}$$

The above equation can be differentiated to obtain the relationship $S_e(D)$ between the ramp voltage $V_{slope}$ and the duty cycle D:

$$S_e(D) = \frac{d}{dt} V_{Slope}(t) \bigg|_{t=DT_s} = \frac{Kf_S}{DC} \times e^{-\frac{D}{\tau f_S}} + \frac{I_{charge}}{C} \tag{6}$$

In this application, Se(D) may be referred as the slope of the ramp voltage.

Figure 10:
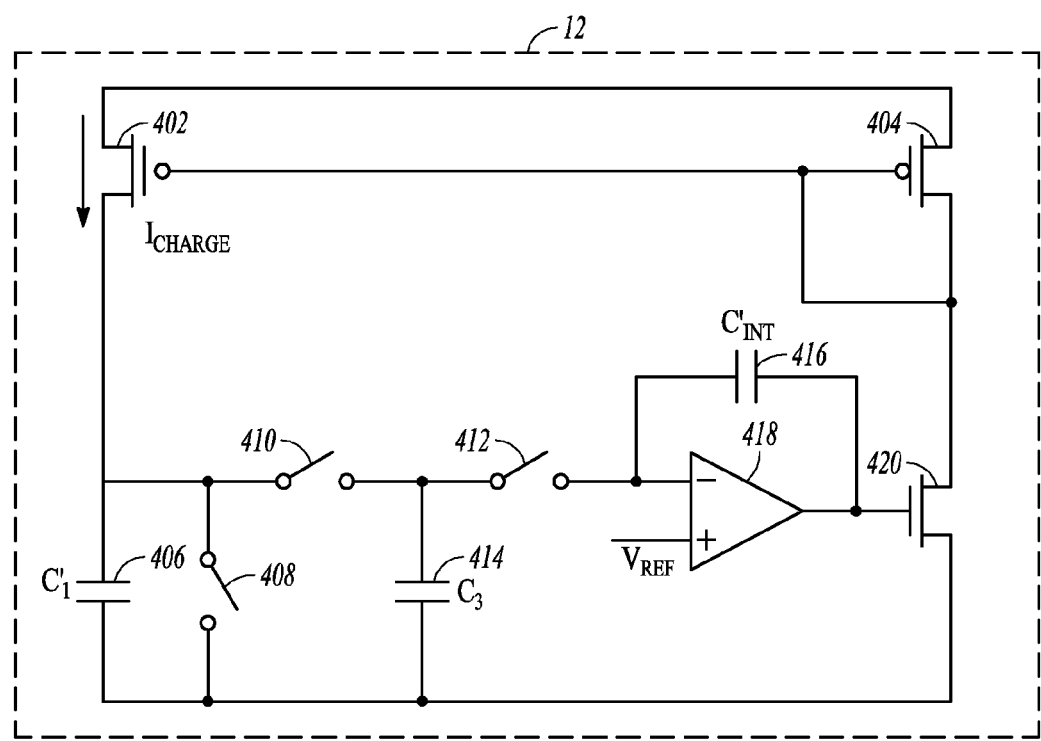
FIG. 10 is a schematic diagram illustrating a base compensation current generating device in a switching regulator according to an embodiment of this invention.

FIG. 10 is a schematic diagram illustrating the base compensation current generating device 12 in the switching regulator according to an embodiment of the invention. The specific structure and description for the base compensation current generating device 12 are illustrative. One skilled in the art can appreciate that the base compensation current generating device 12 can employ any other structure, provided that it can generate a compensation signal for avoiding the oscillation of the current mode as described above.

As shown, the base compensation current generating device 12 comprises a transistor 402, a transistor 404, a capacitor 406, a switch 408, a switch 410, a switch 412, a capacitor 414, a capacitor 416, an operational amplifier 418, and a transistor 420. The connections between the components of the base compensation current generating device 12 are similar to those of the first injection current generating device 14, and thus are omitted herein.

When the switching regulator 10 is turned off, the switch 410 is closed, the switches 408 and 412 are opened, and the capacitors are charged. In this embodiment, the capacitor 406, the capacitor 414, and the switch 410 may also be collectively referred as a base current-voltage conversion unit, which is coupled to generate a base voltage by performing the charging operation when the switching regulator 10 is turned off.

When the switching regulator 10 is turned on, the switch 410 is opened, and the switches 408 and 412 are closed, such than an integration operation is performed on the base voltage. In this embodiment, the operational amplifier 418, the capacitor 416, and the switches 408 and 412 may also be collectively referred as a base switch capacitor integration unit, which is coupled to generate the integrated base voltage by performing an integration operation on the base voltage when the switching regulator 10 is turned on.

The integrated base voltage from the base switch capacitor integration unit is converted into a base compensation current $I_{charge}$ though the transistor 420. In this embodiment, the transistor 420, the transistor 402, and the transistor 404 may also be collectively referred to as a base voltage-current conversion unit, which is coupled to convert the integrated base voltage into the base compensation current $I_{charge}$.

For example, when the base compensation current generating device 12 according to this embodiment is employed, a base compensation current $I_{charge}$ as represented by the following equation can be generated:

$$I_{charge} = \frac{V_{REF} \times C_1' \times f_s}{(1-D)} = K_2 \frac{f_s}{(1-D)} \quad (7)$$

where C1' is the capacitance of the capacitor 406, $K_2 = \alpha \times I_o \times R_{sense}$, $\alpha \times I_0$ corresponds to the value of the ripple of the sensing current, and $R_{sense}$ corresponds to the equivalent resistance for current sampling.

This equation can be combined with the above equation (5) to generate the slope compensation voltage signal $V_{slope}$ represented by the following equation:

$$V_{Slope}(t) = \frac{\tau K f_s}{DC}\left(1 - e^{\frac{t}{\tau}}\right) + K_2 \frac{f_s}{C(1-D)} \cdot t \quad (8)$$

Further, the relationship $S_{e\_total}$ between the ramp voltage and the duty cycle D can be acquired as follows:

$$S_{e\_total}(D) = \frac{Kf_S}{DC} \times e^{-\frac{D}{\tau \cdot f_s}} + K_2 \frac{f_s}{C(1-D)} \quad (9)$$

The second part of this equation which corresponds to the base compensation current $I_{charge}$ can be referred to as $S_{e\_target}$ in this application. That is:

$$S_{e\_target}(D) = K_2 \frac{f_s}{C(1-D)} \quad (10)$$

FIGS. 11a-11d are graphs illustrating the relationships between the duty cycle and the ramp voltage in the switching regulator 10 according to an embodiment of the invention, as described below.

Figure 11A:
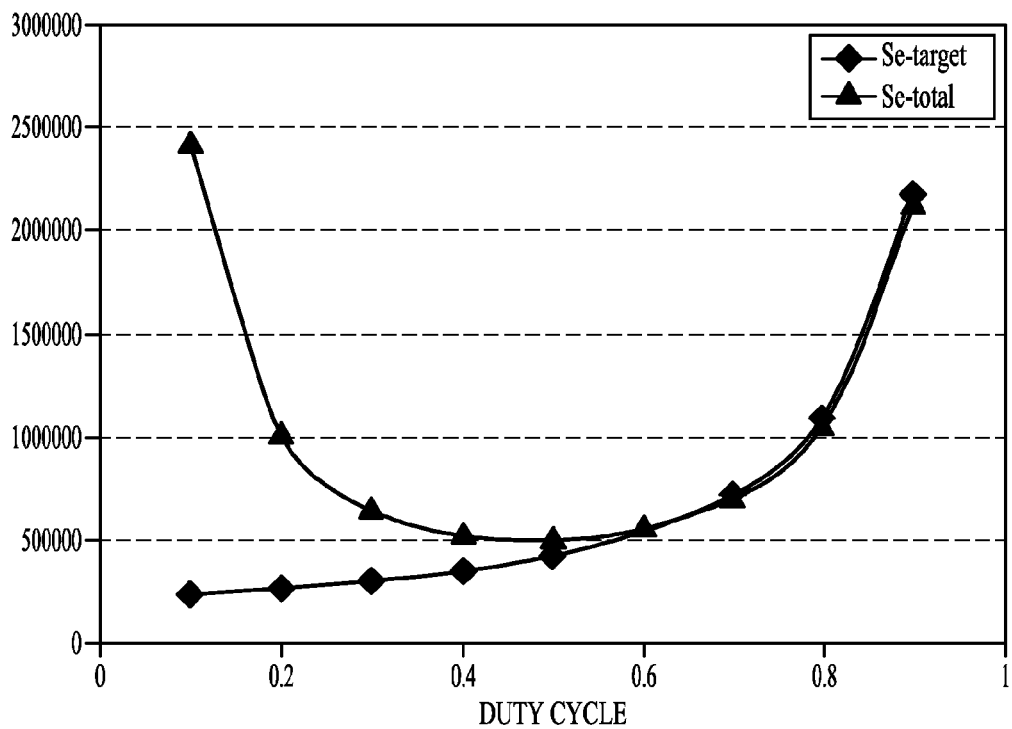
FIGS. 11a-11d are graphs illustrating the relationships between duty cycle and ramp voltage in a switching regulator according to an embodiment of this invention.

FIG. 11a is a graph illustrating the relationships between the duty cycle and the slope of the ramp voltage in the switching regulator 10 according to an embodiment of the invention, and the slope of the ramp voltage without applying the injection current. As shown in FIG. 11a, when the boost corresponding to the injection current is not applied, the slope $S_{e\_target}$ of the base compensation ramp voltage decreases as the duty cycle decreases. By contrast, when the boost corresponding to the injection current is applied, the slope $S_{e\_total}$ of the total ramp voltage vs. the duty cycle is like a parabola. That is, the slope $S_{e\_total}$ becomes large at smaller and larger duty cycles, and becomes small at medium duty cycles.

Figure 11B:
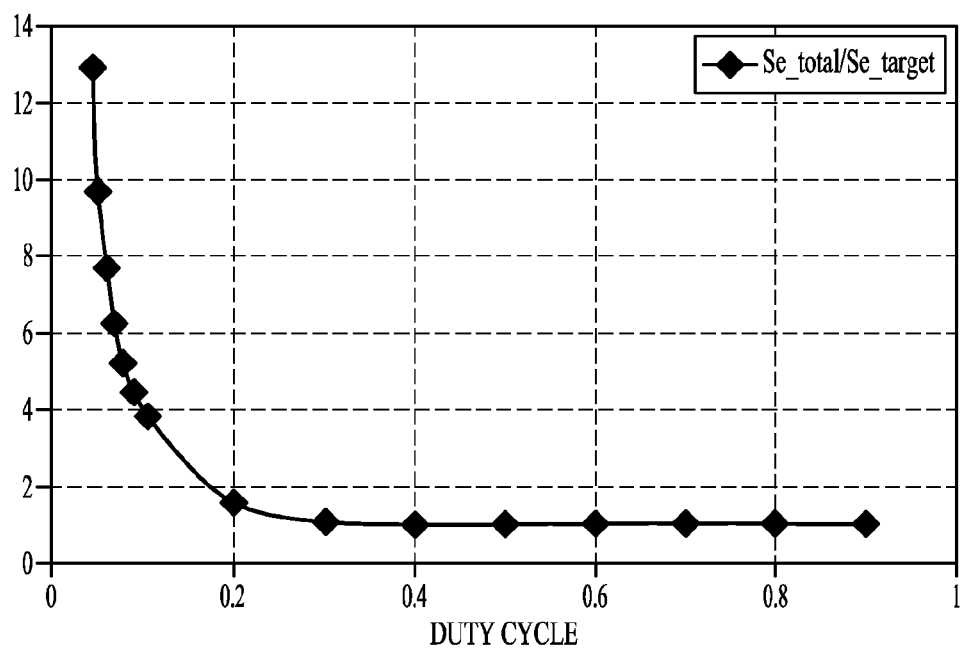

FIG. 11b is a graph illustrating the relationships between the duty cycle and a ratio of the slope of the ramp voltage in the switching regulator 10 according to an embodiment of the invention, to the slope of the ramp voltage without applying the injection current. As shown in FIG. 11b, as the duty cycle decreases, when the duty cycle approaches a predetermined threshold such as the shown 0.2, the slope $S_{e\_total}$ of the total ramp voltage dramatically increases, as compared with the slope $S_{e\_target}$ of the base compensation ramp voltage without applying the injection current. That is, the slope of the boosted ramp voltage at a small duty cycle dramatically increases to cause the switching regulator 10 to operate in voltage mode. As the duty cycle increases, the ratio of $S_{e\_total}/S_{e\_target}$ decreases and becomes a substantially constant ratio of 1 when the duty cycle is larger than 0.5. That is, at the large duty cycle, the part of the boosted ramp voltage corresponding to the injection current decreases to approximately 0, and thus substantially only the base compensation voltage functions. Thereby, a smooth transformation between the voltage mode control and the current control mode can be implemented.

Figure 11C:
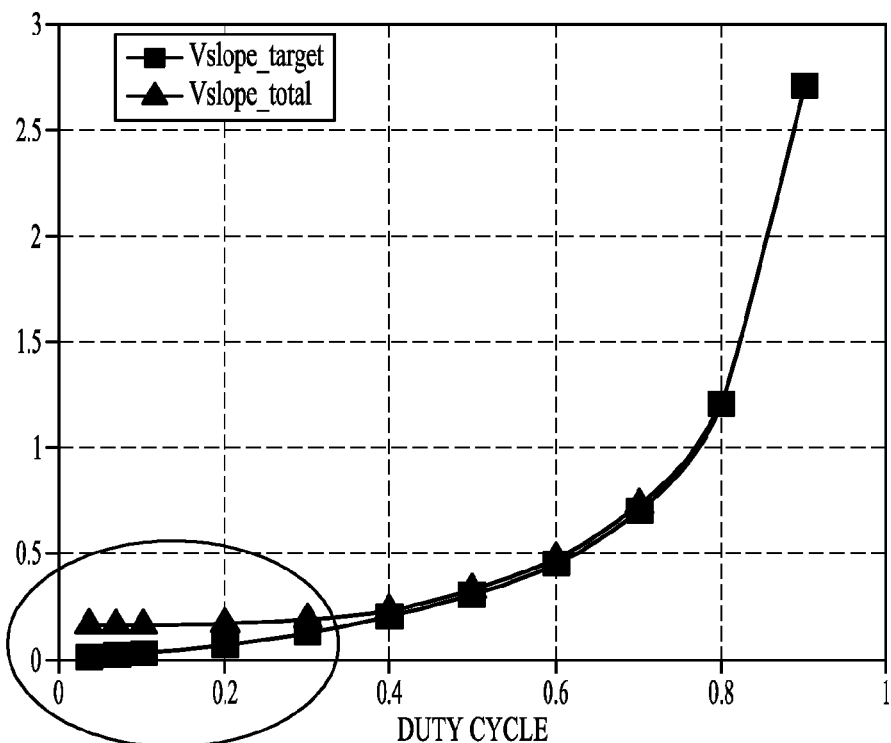
Figure 11D:
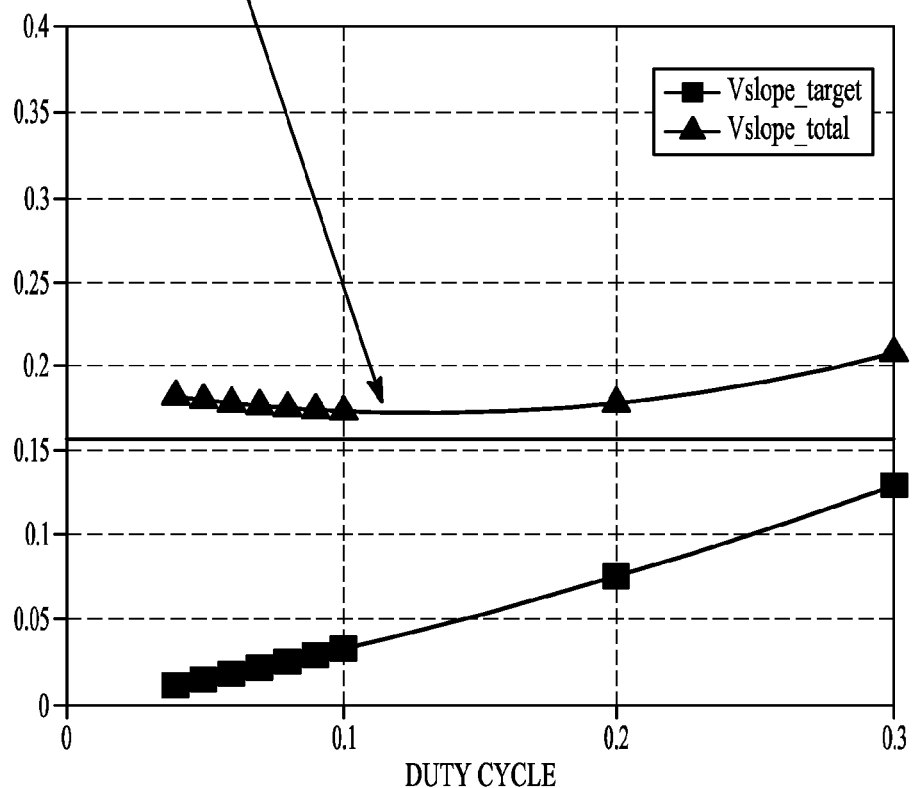

FIG. 11c is a graph illustrating the relationships between the duty cycle and the slope of the ramp voltage in the switching regulator 10 according to an embodiment of the invention, and the slope of the ramp voltage without applying the injection current. FIG. 11d is an enlarged view for the case of small duty cycle, such as the part of the graph in FIG. 11c surrounded by the circle. Likewise, as shown in FIGS. 11c and 11d, as the duty cycle decreases, when the duty cycle approaches a predetermined threshold such as the shown 0.2, the total ramp voltage $V_{slope\_total}$ dramatically increases, as compared with the base compensation ramp voltage $V_{slope\_target}$ without applying the injection current. As the duty cycle increases, the injection current decreases, the boosted ramp voltage decreases, and the total ramp voltage $V_{slope}$ total gradually approaches the base compensation ramp voltage $V_{slope\_target}$.

For example, in one embodiment, the injection current at a duty cycle of 20% can be caused to decrease to approximately 0.

A design example for implementing the hybrid mode control in the switching regulator 10 according to an embodiment of the invention will be described now. It is assumed that the switching frequency Fs=1 MHz, the input voltage Vin=5V, the output current Io=6 A, the resistance of the sensing resistor 130 Ri=0.15Ω, C=4.2 pF, α=0.3. The τ and K are designed based on the above assumption.

The design rule can be assumed as follows:

τ<=50 ns (at the duty cycle of 5%), it may select:
τ=5×10⁻⁸ ns, $C_2$=1 pF, $R_2$=50 kohm The ramp voltage Vslope should be not smaller than 150 mV at the duty cycle of 5%, the Se_total/Se_target is not greater than 10 at the duty cycle of 5%, and the Se_total/Se_target is not greater than 1.5 at the duty cycle of 30%.

From this, the following relationship can be obtained:

K<1.46×10⁻¹²

The K can be taken as K=1×10⁻¹².

It should be noted that the numbers described above and in FIGS. 11a-11d are merely illustrative.

Figure 12:
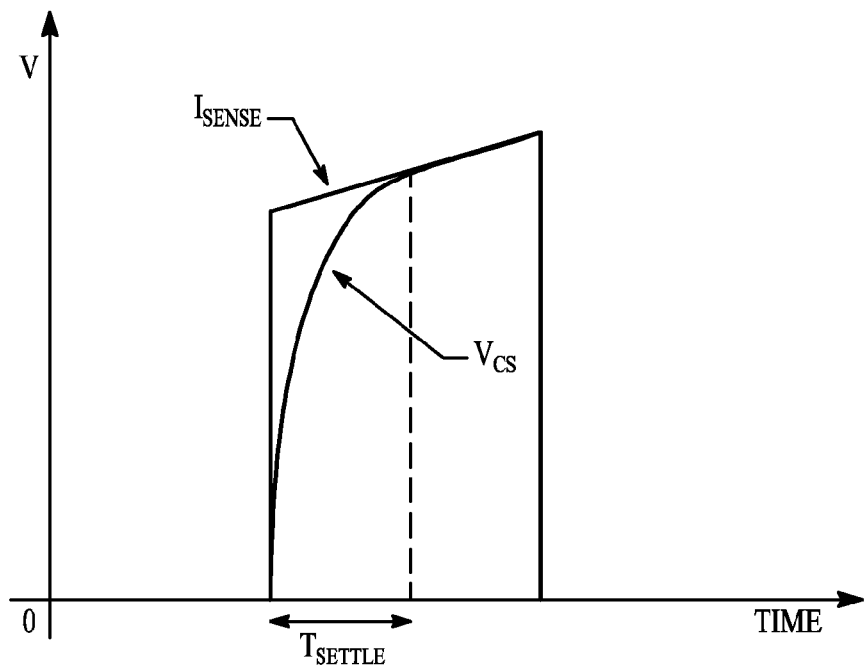
FIG. 12 is a graph illustrating the setting for the current sensing signal of the current sensing device in a switching regulator according to an embodiment of this invention.

According to an embodiment of the invention, the current sensing signal in the switching regulator 10 can be set to facilitate the transformation to the voltage mode at small duty cycle. FIG. 12 is a graph illustrating the setting for the current sensing signal of the current sensing device in the switching regulator 10 according to an embodiment of the invention. In the present embodiment, the setting can be performed by the current amplifier 142.

Figure 13:
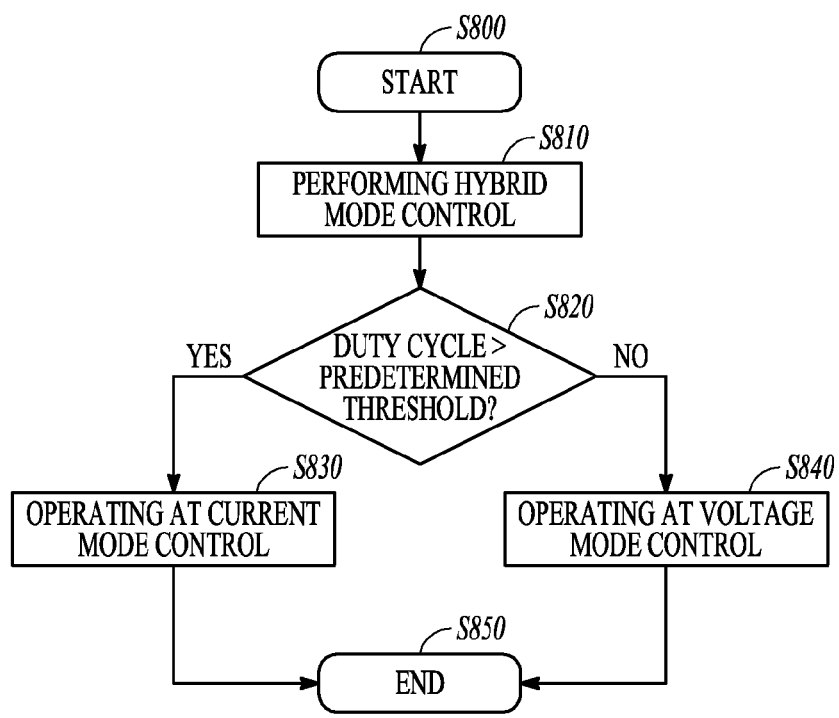
FIG. 13 is a flow diagram illustrating a control method for a switching regulator according to an embodiment of this invention.

As shown in FIG. 13, as compared with the current sensing signal $I_{sense}$ in a conventional current mode, the settling time $T_{settle}$ for the current sensing signal Vcs of the current sensing device in the switching regulator 10 according to an embodiment of the invention slows down. Thus, the overshoot in conventional current mode will not occur, and the blanking time for the current sensing can be lowered or removed. As a non-limiting example, the settling time can be set at, for example, 150 ns.

According to the present embodiment, at low duty cycle, the current signal is low, and the slope compensation voltage is high, such that the switching regulator 10 is working in voltage mode.

For the switching regulator 10 according to an embodiment of the invention, over-current protection can be implemented. For example, the current sensing device can be configured to implement the over-current protection by the following scheme: detecting the current sensing signals of the high side and low side; setting the settling time of the high side current sensing signal to be not greater than the blanking time of the low side current sensing signal; when the duty cycle is higher than the predetermined threshold, employing the high side current sense signal, and if the over-current occurs and counts till the set settling time of the high side current sensing signal, then entering a hiccup mode; and when the duty cycle is not higher than the predetermined threshold, employing the low side current sense signal, and if the over-current with a glitch time occurs, then entering the hiccup mode. It is apparent for one skilled in the art that over-current protection for the switching regulator can be implemented using various appropriate schemes.

A control method for the switching regulator according to the embodiment of this invention will be described now.

FIG. 13 is a flow diagram illustrating a control method for a switching regulator according to an embodiment of the invention.

As shown in FIG. 13, the control method starts at step S800. At step S810, the hybrid control mode including the current mode and the voltage mode is performed.

At step S820, it is determined whether the duty cycle of the switching regulator is higher than a predetermined threshold, and transforming the control mode of the switching regulator according to its duty cycle.

If the duty cycle is higher than the predetermined threshold, the flow proceeds to step S830 where the switching regulator is made to operate in current control mode, and then the flow ends at step S850. If the duty cycle is not higher than the predetermined threshold, the flow proceeds to step S840 where the switching regulator is made to operate in voltage control mode, and then the flow ends at step S850.

In the above control method, the specific processes for transforming from current mode to voltage mode at low duty cycle are similar to those described above with respect to a switching regulator according to an embodiment of the invention, and thus will not be repeated here for brevity.

The switching regulator and the control method therefore have excellent performance.

Figure 14:
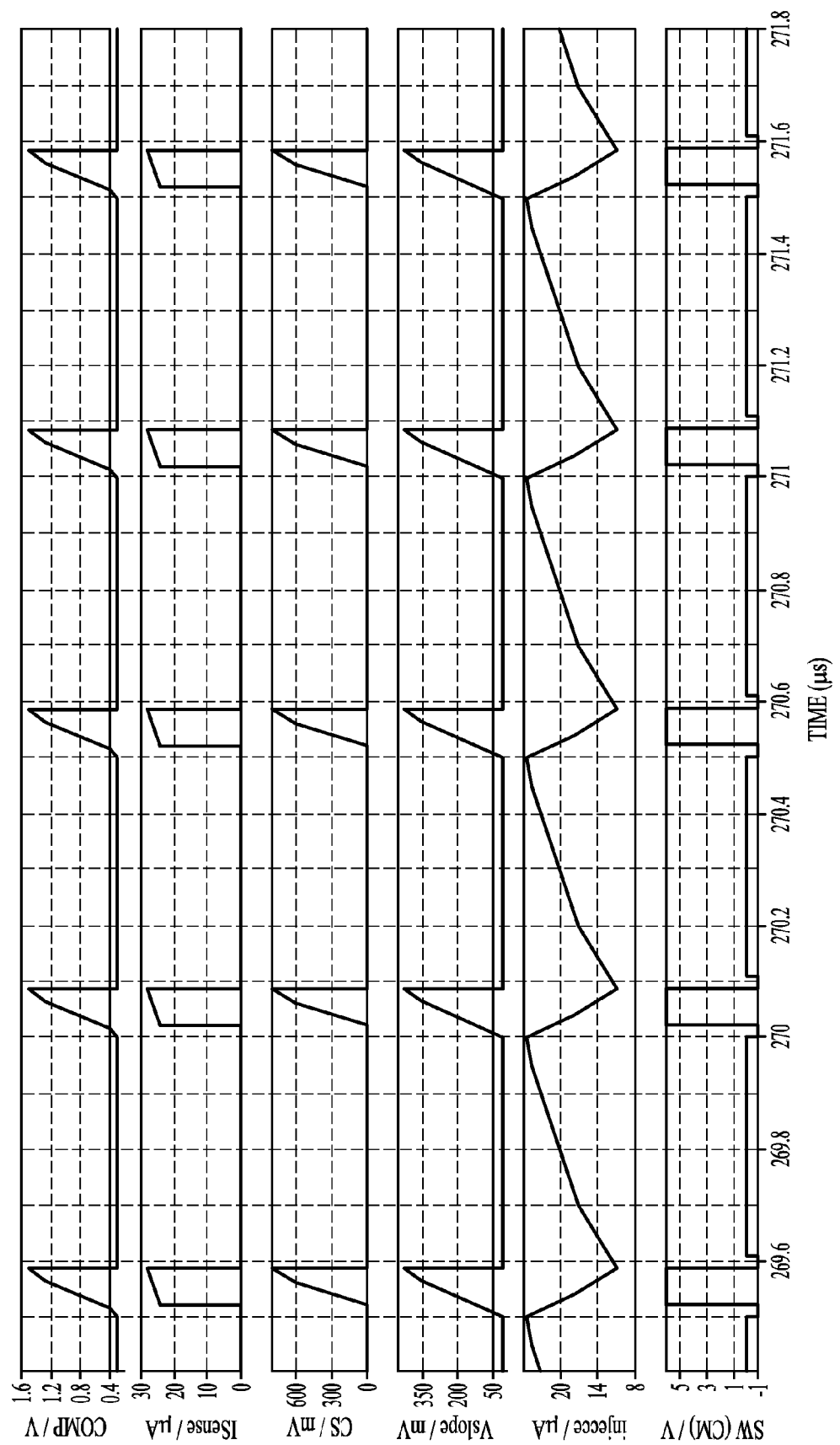
FIG. 14 is a graph illustrating steady operation for a switching regulator according to an embodiment of this invention.

FIG. 14 is a graph illustrating steady operation for the switching regulator according to an embodiment of the invention. It is assumed that Vin=6V, Vout=0.6V, Fs=2 MHz, Io=6 A. As shown in FIG. 14, from the PWM waveform of the switching regulator, it can achieve steady switch nodes output SW(CM) when the injection current is applied.

Figure 15A:
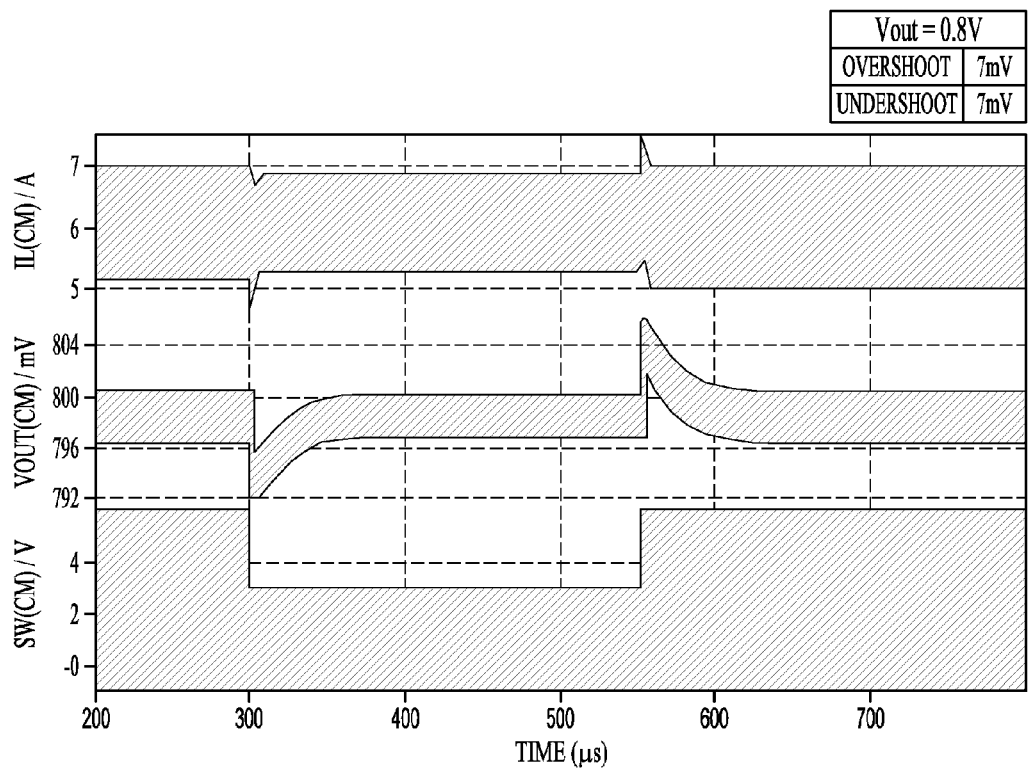
FIGS. 15a and 15b are graphs illustrating line transient performance for a switching regulator according to an embodiment of this invention when the input voltage varies.
Figure 15B:
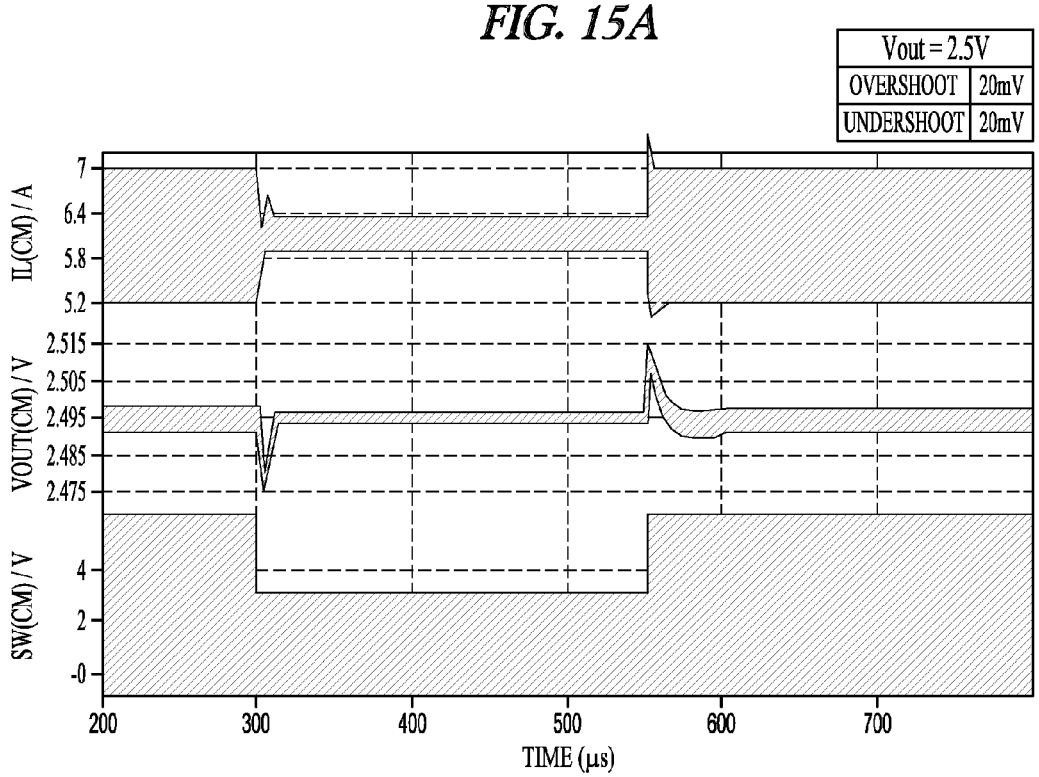
Figure 16A:
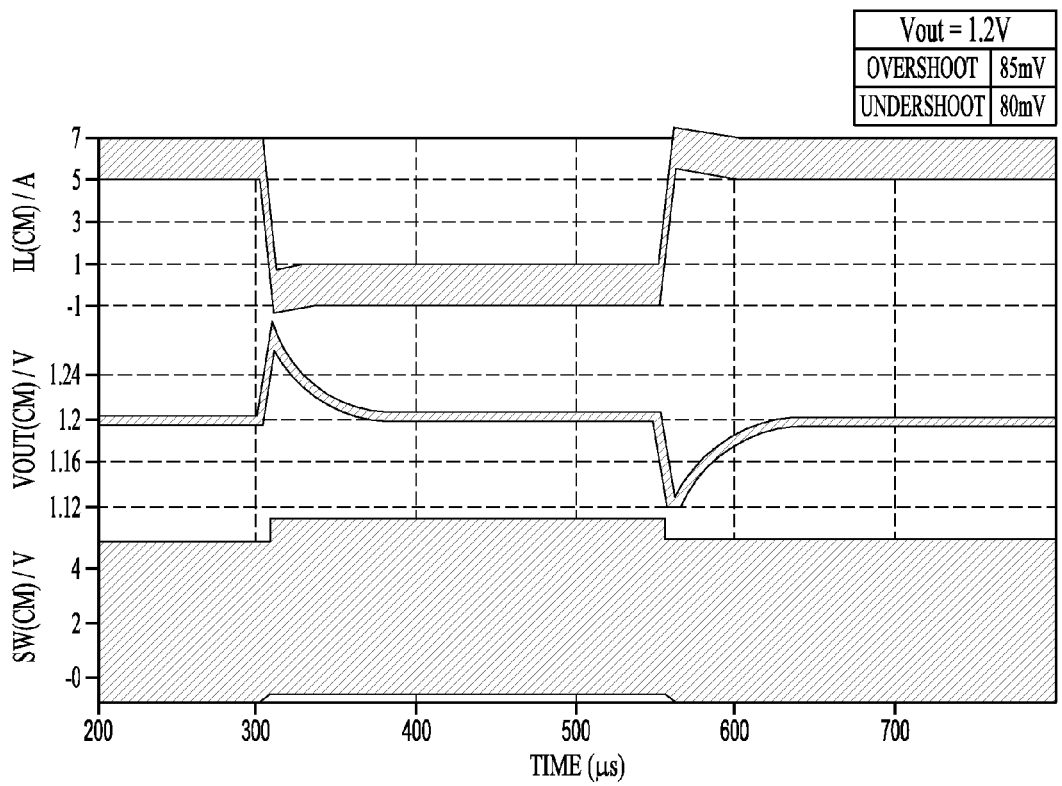
FIGS. 16a and 16b are graphs illustrating load transient performance for a switching regulator according to an embodiment of this invention when the load varies.
Figure 16B:
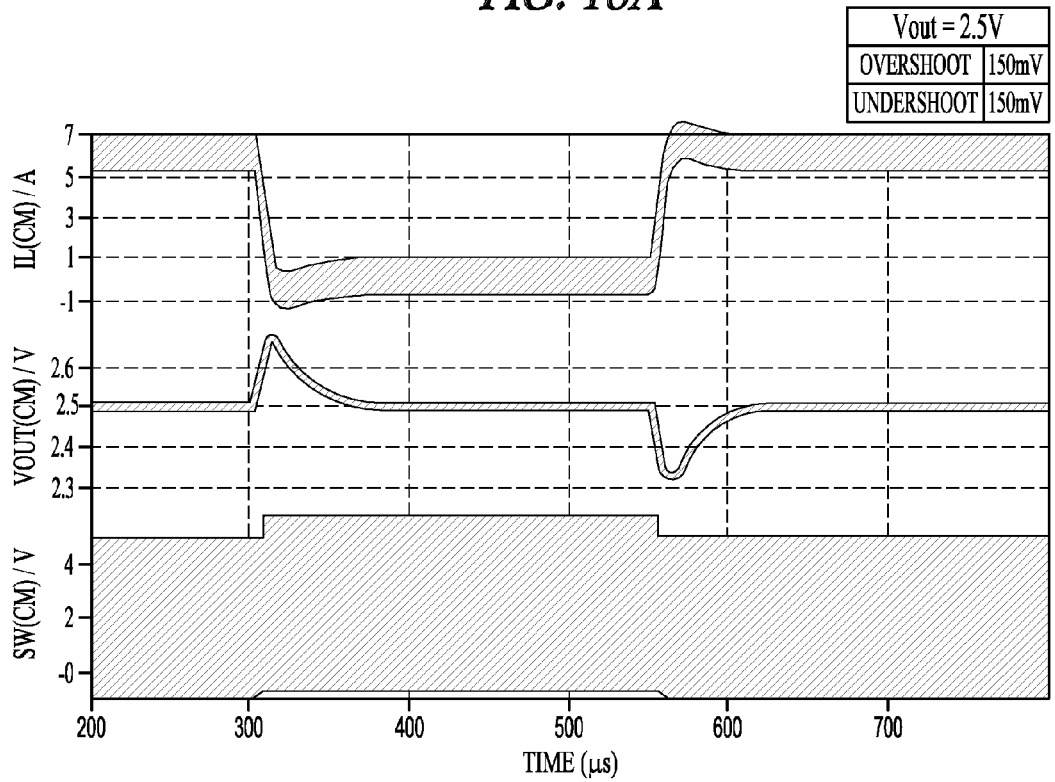

FIGS. 15a and 15b are graphs illustrating line transient performance for a switching regulator according to an embodiment of the invention when the input voltage varies. It is assumed that Fs=1 MHz, Vin=6-3-6V, Io=6 A. FIGS. 16a and 16b are graphs illustrating load transient performance for the switching regulator according to an embodiment of the invention when the load varies. It is assumed that Fs=1 MHz, Vin=5V, Io=6-0-6A. As shown, when the input voltage or the load varies, both the overshoot and the undershoot for the output voltage are smaller. This shows that optimum dynamic performance for the switching regulator can be achieved.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be limited since other modifications will become apparent to the skilled practitioner upon a study of the drawings, specification, and following claims.

What is claimed is:

1. A switching regulator comprising:
   a mode transforming device configured to transform a control mode of the switching regulator according to a duty cycle of the switching regulator, such that the switching regulator is configured to operate in a hybrid control mode comprising a current mode and a voltage mode according to the control mode;
   wherein the mode transforming device is configured to cause the switching regulator to transform from operating in current mode to operating in voltage mode in response to a duty cycle decreasing, including causing the switching regulator to operate in voltage mode when the duty cycle is not greater than a predetermined threshold.

2. The switching regulator of claim 1, wherein the predetermined threshold is determined according to switching cycle and the minimum on time of the current mode of the switching regulator.

3. The switching regulator of claim 1, wherein the mode transforming device further comprises:
   a current sensing device configured to generate a current sensing signal;
   a slope compensation device configured to generate a ramp voltage signal as a function of the duty cycle; and
   a summing device coupled to sum the ramp voltage signal and the current sensing signal; and the switching regulator further comprises:
   an error amplifier coupled to receive a reference voltage signal and to output a comparison voltage to be compared with a sampling control signal; and
   a comparing device coupled to compare the summed signal from the summing device as said sampling control signal, with the comparison voltage, and wherein the switching regulator is configured to adjust its output in response to a result of the comparison from the comparing device.

4. The switching regulator of claim 3, wherein the current sensing device is configured to set a settling time for the current sensing signal such that the settling time slows as compared with that when in current mode control.

5. The switching regulator of claim 4, wherein the slope compensation device further comprises:
   a base compensation current generating device configured to generate a base compensation current signal for the slope compensation of the current mode;
   a first injection current generating device configured to generate a first injection current signal having a value substantially inversely proportional to the duty cycle;
   a current combination device configured to combine the base compensation current signal and the first injection current signal; and
   a current-voltage conversion device coupled to generate the slope compensation voltage signal by using the combined signal from the current combination device.

6. The switching regulator of claim 4, wherein the slope compensation device further comprises:
- a base compensation current generating device configured to generate a base compensation current signal for the slope compensation of the current mode;
- a first injection current generating device configured to generate a first injection current signal having a value substantially inversely proportional to the duty cycle;
- a second injection current generating device configured to generate a second injection current signal as an exponential current through charging and discharging operations using the first injection current signal;
- a current combination device configured to combine the base compensation current signal and the second injection current signal; and
- a current-voltage conversion device coupled to generate the slope compensation voltage signal by using the combined signal from the current combination device.

7. The switching regulator of claim 6, wherein the base compensation current generating device further comprises:
- a base current-voltage conversion unit coupled to generate a base voltage by performing the charging operation when the switching regulator is turned off;
- a base switch capacitor integration unit coupled to generate an integrated base voltage by performing an integration operation on the base voltage when the switching regulator is turned on; and
- a base voltage-current conversion unit coupled to convert the integrated base voltage into the base compensation current.

8. The switching regulator of claim 6, wherein the first injection current generating device further comprises:
- a first current-voltage conversion unit coupled to generate a first injection voltage by performing the charging operation when the switching regulator is turned on;
- a first switch capacitor integration unit coupled to generate an integrated first injection voltage by performing an integration operation on the first injection voltage when the switching regulator is turned off; and
- a first voltage-current conversion unit coupled to convert the integrated first injection voltage into the first injection current.

9. The switching regulator of claim 6, wherein the second injection current generating device further comprises:
- a second current-voltage conversion unit coupled to generate a second injection voltage by performing the charging operation when the switching regulator is turned off; and
- a second voltage-current conversion unit coupled to convert the second injection voltage into the second injection current by performing the discharge operation when the switching regulator is turned on.

10. The switching regulator of claim 3, wherein the current sensing device is further configured to perform the processes of:
- detecting high side and low side current sensing signals;
- setting the settling time of the high side current sensing signal to be not greater than the blanking time of the low side current sensing signal;
- when the duty cycle is higher than the predetermined threshold, employing the high side current sense signal, and if an overcurrent occurs and counts until the set settling time of the high side current sensing signal, then entering a hiccup mode; and
- when the duty cycle is not higher than the predetermined threshold, employing the low side current sense signal, and if an overcurrent with a glitch time occurs, then entering the hiccup mode.

11. A method of controlling a switching regulator, the method comprising:
- creating a hybrid control mode comprising a current mode and a voltage mode of the switching regulator; and
- transforming the control mode of the switching regulator according to its duty cycle;
- wherein the switching regulator is caused to operate in current mode when the duty cycle is greater than a predetermined threshold; and
- wherein the switching regulator is caused to operate in voltage mode when the duty cycle is not greater than the predetermined threshold.

12. The method of claim 11, wherein the predetermined threshold is determined according to a switching cycle and the minimum on time of the current mode of the switching regulator.

13. The method of claim 11, wherein the transforming further comprises:
- generating a current sensing signal;
- generating a ramp voltage signal as a function of the duty cycle;
- summing the ramp voltage signal and the current sensing signal; and
- controlling the transformation of the control mode of the switching regulator using the summed signal.

14. The method of claim 13, wherein generating the current sensing signal further comprises setting a settling time for the current sensing signal such that the settling time slows as compared with that when in current mode control.

15. The method of claim 14, wherein generating the ramp voltage signal further comprises:
- generating a base compensation current signal for the slope compensation of the current mode;
- generating a first injection current signal having a value substantially inversely proportional to the duty cycle;
- combining the base compensation current signal and the first injection current signal; and
- generating the slope compensation voltage signal by using the combined signal.

16. The method of claim 14, wherein generating the ramp voltage signal further comprises:
- generating a base compensation current signal for the slope compensation of the current mode;
- generating a first injection current signal having a value substantially inversely proportional to the duty cycle;
- generating a second injection current signal as an exponential current through charging and discharging operations using the first injection current signal;
- combining the base compensation current signal and the second injection current signal; and
- generating the slope compensation voltage signal by using the combined signal from the current combination device.

17. The method of claim 14, wherein generating the current sensing signal further comprises:
- detecting the high side and low side current sensing signals;
- setting the settling time of the high side current sensing signal to be not greater than the blanking time of the low side current sensing signal;
- when the duty cycle is higher than the predetermined threshold, employing the high side current sense signal, and if an overcurrent occurs and counts until the set settling time of the high side current sensing signal, then entering a hiccup mode; and when the duty cycle is not higher than the predetermined threshold, employing the low side current sense signal, and if an overcurrent with a glitch time occurs, then entering the hiccup mode.

18. A switching regulator comprising:

a mode transforming device configured to transform a control mode of the switching regulator according to a duty cycle of the switching regulator, such that the switching regulator is configured to operate in a hybrid control mode comprising a current mode and a voltage mode according to the control mode, the mode transforming device comprising:
- a current sensing device configured to generate a current sensing signal;
- a slope compensation device configured to generate a ramp voltage signal as a function of the duty cycle; and
- a summing device coupled to sum the ramp voltage signal and the current sensing signal;

an error amplifier coupled to receive a reference voltage signal and to output a comparison voltage to be compared with a sampling control signal; and a comparing device coupled to compare the summed signal from the summing device as said sampling control signal, with the comparison voltage, wherein the switching regulator is configured to adjust its output in response to a result of the comparison from the comparing device.

19. The switching regulator of claim 18, wherein the slope compensation device further comprises:
- a base compensation current generating device configured to generate a base compensation current signal for the slope compensation of the current mode;
- a first injection current generating device configured to generate a first injection current signal having a value substantially inversely proportional to the duty cycle;
- a current combination device configured to combine the base compensation current signal and the first injection current signal; and
- a current-voltage conversion device coupled to generate the slope compensation voltage signal by using the combined signal from the current combination device.

20. The switching regulator of claim 18, wherein the slope compensation device further comprises:
- a base compensation current generating device configured to generate a base compensation current signal for the slope compensation of the current mode;
- a first injection current generating device configured to generate a first injection current signal having a value substantially inversely proportional to the duty cycle;
- a second injection current generating device configured to generate a second injection current signal as an exponential current through charging and discharging operations using the first injection current signal;
- a current combination device configured to combine the base compensation current signal and the second injection current signal; and
- a current-voltage conversion device coupled to generate the slope compensation voltage signal by using the combined signal from the current combination device.

* * * * *

UNITED STATES PATENT AND TRADEMARK OFFICE
CERTIFICATE OF CORRECTION

PATENT NO.         : 8,994,352 B2                                          Page 1 of 1
APPLICATION NO.    : 13/364711
DATED              : March 31, 2015
INVENTOR(S)        : Zhu et al.

It is certified that error appears in the above-identified patent and that said Letters Patent is hereby corrected as shown below:

Title page, item (30), in "Foreign Application Priority Data", in column 1, line 1, delete "2011 1 0232548" and insert --201110232548.5--, therefor Signed and Sealed this
Twenty-first Day of July, 2015

Michelle K. Lee
*Director of the United States Patent and Trademark Office*